Nov. 26, 1957  R. H. BOLSTER ET AL  2,814,371
INCHING VALVE

Filed Dec. 15, 1955  2 Sheets-Sheet 1

INVENTORS.
RONALD H. BOLSTER
ROBERT LAPSLEY
BY
Brown, Jackson, Boettcher & Dienner

ATTY.

Nov. 26, 1957 R. H. BOLSTER ET AL 2,814,371
INCHING VALVE
Filed Dec. 15, 1955 2 Sheets-Sheet 2

INVENTORS.
RONALD H. BOLSTER
ROBERT LAPSLEY
BY
Brown, Jackson, Boettcher & Dienner
ATTY.

United States Patent Office 2,814,371
Patented Nov. 26, 1957

2,814,371

INCHING VALVE

Ronald H. Bolster, Jackson, and Robert Lapsley, Buchanan, Mich., assignors to Clark Equipment Company, a corporation of Michigan Application December 15, 1955, Serial No. 553,333

6 Claims. (Cl. 192—13)

This invention relates generally to improvements in valves for use in fluid operated control systems. More particularly, the valve of this invention is constructed to control and regulate fluid pressures, the same being disposed between a source of pressurized fluid and a device operated thereby, for example, a transmission clutch.

Briefly, the invention herein constitutes an improved inching control valve mechanism which finds particular usefulness in regulating pressure to a fluid operated clutch mechanism of the type found in industrial lift trucks in which the clutch is normally supplied with excess pressure to accommodate abnormal clutch loads. Specifically, the valve is constructed to permit an immediate relief of such excess pressures followed by regulated decrease or increase in the pressure of fluid supplied to a hydraulically operated clutch whereby the latter may be gradually disengaged and engaged by the operator. One particular use of this valve, as mentioned, contemplates the control of a hydraulic clutch for the transmission of an industrial lift truck. In such a vehicle, it is often necessary to hold the truck stationary while the lift fork or like material engaging device is operated at full engine speed without shifting the transmission to neutral. It is desirable in such circumstances to be able to "inch" the vehicle forwardly or rearwardly, as desired, to accommodate its positioning and the handling of material.

To carry out this inching feature, the present invention has been perfected to provide improved gradual engagement and disengagement of the clutch, after relief of excess pressures in the system, by operating our improved valve in conjunction with the application and release of the vehicle's brake system. The valve of the invention may be characterized generally as a spool type having a suitable porting system and a novel opposing spring means therein, so as to provide an accurate, but rugged valve means capable of relieving overpressures to gain a workable pressure which is thereafter regulated to control the transmission clutches of the vehicle.

The main object of the invention is to provide a new and improved inching valve having pressure relief and regulating features for use in fluid operated control systems.

Another object of the invention is to provide a new and improved inching valve for use in industrial lift trucks using a hydraulic transmisison system to the end that the vehicle's clutch mechanism may be gradually engaged or disengaged at the will of the operator by operating the vehicle's brake system.

Still another object of this invention is to provide a new and improved inching valve for industrial lift trucks and like vehicles which is operable at the manipulation of a foot pedal associated with the vehicle's brake system.

A still further object of this invention is to provide a new and improved inching valve means for controlling the fluid pressure to a hydraulic clutch mechanism in a vehicle, for initially relieving excess pressure provided for abnormal loadings on the clutch and then gradually and evenly reducing the pressure on the clutch so that the vehicle may be inched forwardly or rearwardly as desired.

The above and further objects, features and advantages of this invention will be apparent to those familiar in the art from its following detailed description and the specifications thereof. Such features will be particularly clear from the following descriptive materials taken in association of the embodiment of this invention found in the accompanying drawings.

Figure 1:
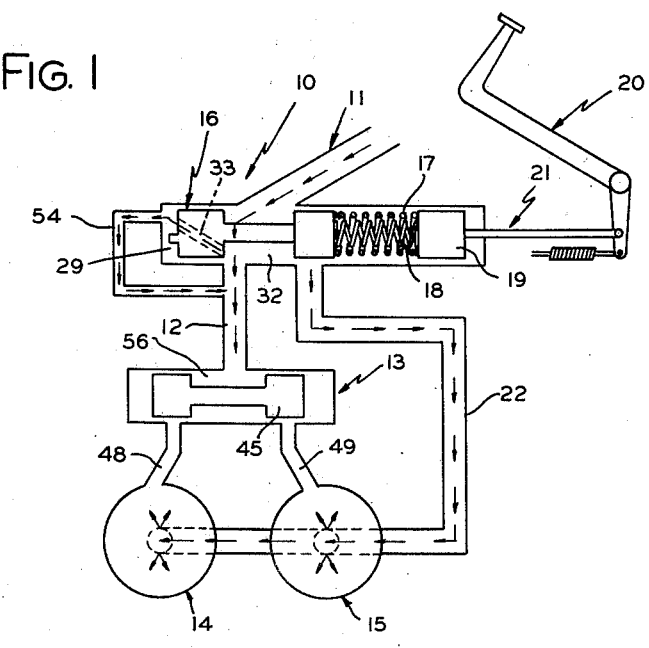
Figure 1 is a schematic representation of a typical hydraulic system in which the valve of our invention finds utility.

As seen in Figure 1, our new and improved valve 10 is employed in a hydraulic circuit of an industrial lift truck. Valve 10 serves to control the pressure of fluid supplied via inlet 11, from the hydraulic pump of the vehicle's transmission, to a conduit means 12 leading to a clutch direction selection means 13. Such means 13 controls the actuation of reverse and forward direction selectors 14 and 15, respectively, of the vehicle's clutch system. Valve 10 includes a valve piston or spool 16 which is actuated to the right, as viewed in Figure 1, by fluid pressure at the left hand end thereof. Such movement of spool 16 serves to compress a spring system comprising compression springs 17 and 18 which extend between the right hand end of the spool 16 and a secondary piston 19, the latter of which is operated in response to the actuation of a brake pedal of the vehicle as indicated generally at 20. Brake pedal 20 is related with piston 19 by a suitable linkage system indicated generally at 21. Depression of brake lever 20 serves to move piston 19 to the right, as shown in Figure 1, to relieve the thrust imposed on spool 16 by the stronger of the two springs and thereby permitting the spool to move to the right against the regulating opposition of the weaker spring to throttle the flow of fluid through conduit 12 and to relieve the pressure of the supply fluid by returning fluid to the sump for the transmission pump via passageway means 22.

Without dwelling on the particulars of the system at greater length at this point, it is sufficient for present purposes to point out that the operation of the piston spool 16 in response to activity of the brake pedal, as related, serves first to diminish the pressure of fluid supplied from the main supply conduit 11 by opening the passageway 22 and thereafter to regulate the pressure of fluid supplied to the clutches by conduit means 12. Essenitally, the system is constructed so that initial depression of the brake pedal 20 serves to vent off the pressure of the supply fluid until a workable limit is reached which function is followed by a gradual deactivation of the fluid operated clutch associated with the vehicle.

Figure 2:
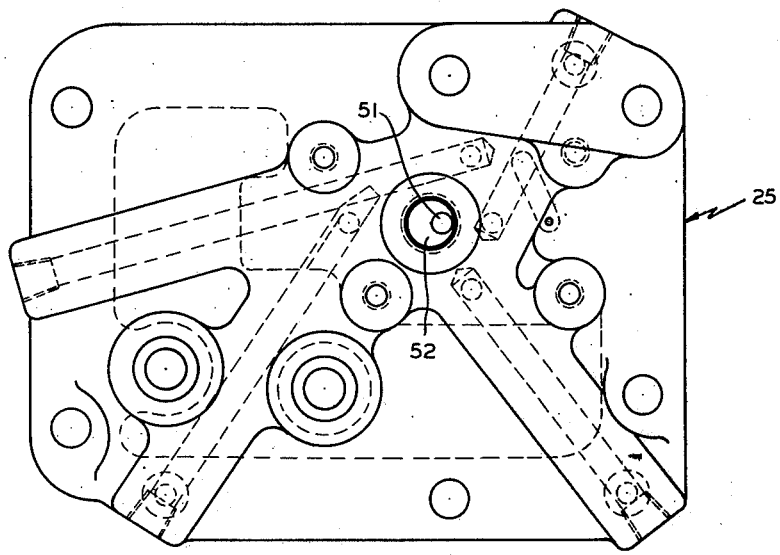
Figure 2 is a top plan view of the new valve of this invention.
Figure 3:
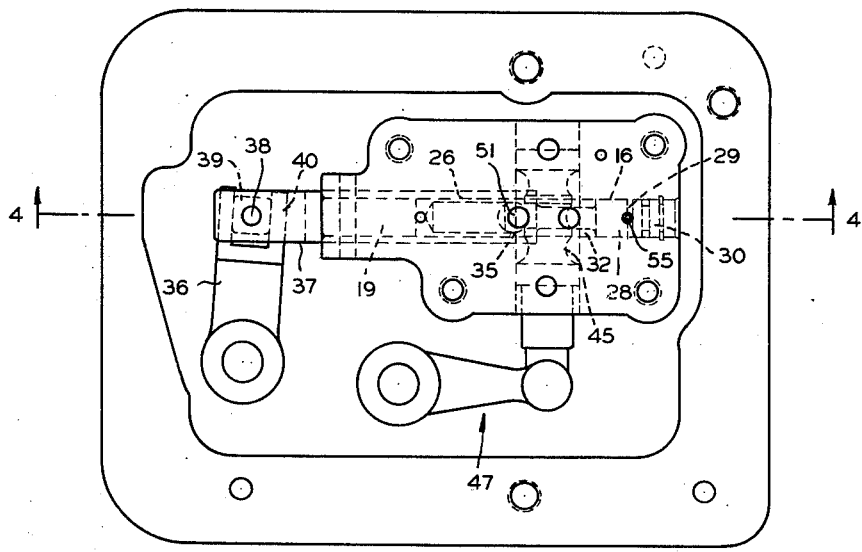
Figure 3 is a bottom plan view of the valve means illustrated in Figure 2.
Figure 4:
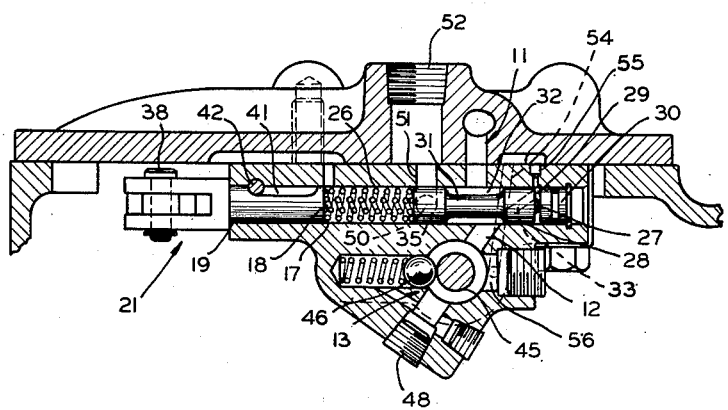
Figure 4 is a longitudinal cross-sectional view of our valve means taken substantially along line 4—4 of Figure 3.

Turning now to the particulars of the improved valve means 10, as shown in Figures 2, 3 and 4 of the drawings, it will be understood that the valve spool 16 is carried in a suitable cast housing 25, having an internal bore 26 in which the spool 16 is mounted. At one end of the valve spool 16, a small axial projection 27 is formed to extend axially outward of an enlarged cylindrical portion 28 of the spool. Such projection 27 serves as a stop spacer to form an annular chamber 29 between the one end of the cylindrical portion 28 and an adjacent face of plug 30 which seals off one end of bore 26.

The inlet passageway means 11 communicates with a central recessed portion of spool 16, or that is, delivers to an indented cylindrical portion 31 thereof. Such portion 31, of course, forms an annular chamber 32 with the adjacent cylindrical side walls of the cylindrical bore 26.

An equalizing passageway 33 communicates between the annular chamber 32 and the annular chamber 29 at the right hand end of the valve spool, as shown in Figure 4 of the drawings, and thereby such serves to equalize fluid pressures in chambers 29 and 32. The left hand end of the spool body 16 bears a second cylindrical portion 35 corresponding to portion 28. Such portion 35 abuts against a pair of coaxial and concentrically related springs 17 and 18, the latter of which is the stronger spring; the weaker spring 17 modifying the compressive thrust of spring 18, especially at the extensible limit of the latter. Springs 17 and 18, of course, serve to oppose the pressure of fluid in chamber 29, thus normally to maintain the piston valve body 16 in its position illustrated in Figure 4.

While one end of the springs 17 and 18 engages the cylindrical portion 35 of the valve spool, the opposite ends thereof engage the piston 19 which is responsive to the actuation of the brake pedal 20. It will be recalled that piston 19 connects to the brake pedal by means of linkage 21, which comprises a crank 36 (see Figure 3) and a shifting lever 37. Connection between crank 36 and lever 37 is made by pin means 38 carrying a bearing block 39 which is received between bifurcated arm portions 40—40 at one end of crank 36. Therefore, when crank 36 is rocked appropriately in arcuate manner, lever 37 is moved axially of the bore 26 to activate piston 19. In this latter regard, note that piston 19 is cut away at 41 to form a slot for key pin 42 which traverses the piston 19; interference between pin 42 and the ends of the cutaway 41 serving to limit the throw of piston 19 and hold the same within the bore 26. Such movement of the piston 19 diminishes the thrust of the springs 17 and 18 and thus acts as a variable pressure regulating means by modifying the fluid pressure opposing thrust against spool body 16.

As the pressurized fluid from passageway 11 enters annular chambers 32 and 29, as explained hereinabove, it also flows at full supply pressure via discharge conduit 12 to the direction selector means 13 which controls operation of the fluid clutch mechanism for the vehicle. Such direction selector means includes a double acting valve spool 45 disposed transversely of the axis of the valve body or piston spool 16. A spring loaded ball bearing 46 serves as a detent means for maintaining the selected positioning of spool 45. Positioning of spool 45 is in response to arcuate actuation of a crank lever 47 having connection with a selector control lever (not shown) manually available to the vehicle's operator as by a Bowden wire link or like means. The positioning of the selector spool 45 serves to control the passage of pressurized fluid to conduits 48 or 49 to thus control the operation of forward or reverse transmission direction selectors 14 and 15 as desired. In this regard, note that the spool 45 has three positions of operation, neutral as shown in Figure 1 or to the right or to the left of that position so as to selectively permit the passage of pressurized fluid to either of the two direction selectors 14 or 15.

Communicating with chamber 26 is a port 50 associated with passageway means 51 and a discharge connection chamber 52. Such connection chamber 52 is joined with passageway means 22 leading directly to the clutch direction selectors for lubricating and cooling such selectors and discharging back to the sump of the supply pump to relieve fluid pressure.

Communicating with chamber 29 is a passageway 54 which has a restricted orifice as at 55; such passageway 54 providing a continuous suppy of fluid from chamber 29 at the right hand end of the valve body 16, as shown in Figure 4, to a chamber 56 at the selector spool 45. Conduits 48 and 49 lead to the fluid clutch mechanisms. The presence of passageway 54 serves two purposes.

First, it maintains the clutch selected by the selector crank 47 and spool 45 full so that when the use of such clutch is required, no delay is experienced in filling the clutch with pressurized fluid. Secondly, such bypass conduit 54 permits the valve body 16 to move to the right, as viewed in Figure 4, more rapidly when such activity is required.

The foregoing description is believed to adequately set forth the elements which comprise the improved inching control valve of this invention. Now, in order to acquaint those familiar in the art as to use and operation of this device and particularly as it is associated with the schematic circuit set forth in Figure 1, descriptive materials which follow are directed to the operation of valve 10 in a fork lift truck.

As stated hereinbefore, pressurized fluid is supplied to the spool 16 of valve assembly 10 via conduit or inlet passageway means 11. Such fluid is delivered to the annular chamber 32 near the mid-section of such spool and via the equalizing passageway 33 in the cylindrical portion 28 of the valve spool to the second annular chamber 29 at the right hand end of such valve spool (see Figure 4). Pressure in chamber 29 urges the valve spool 16 to the left, as shown in Figure 4, but such movement is combatted by the force of springs 17 and 18. As mentioned previously, the two springs 17 and 18 are of unequal strength or values. When the brake pedal is depressed to take up the normal play in the brake linkage, such play is utilized to operate piston 19. Only a small travel of piston 19 is required to relieve the spring 18 from compression. Thus such spring is effectively deactivated so that spool 16 may move rapidly to the left to permit opening of the passageway means 22. The arrangement of the springs also has the desirable effect of making accurate adjustment of the valve unnecessary. For example, with spring 18 in the order of 150 lbs. and a hydraulic system which ordinarily operates at 100 lbs., only a small increment of movement for piston 19 is required to reduce the pressure of spring 18 considerably, to say 100 lbs. Such travel increment for piston 19 then represents the design tolerance allowable in the device without adverse effect on its operation. Sufficient depression of the brake pedal will completely relieve all compressive load on spring 18, and thereafter continued movement of spool 16 to the left will be regulated by the opposing smaller spring 17. Such initial deactivation of spring 18, permits spool 16 to travel rapidly to the left for opening passageway 22.

Normally, the valve is conditioned as pictured in Figure 4 of the drawings, with the valve spool or body 16 disposed so that the annular chamber 32 lies opposite the intake or main supply conduit means 11. Pressurized fluid thus entering the valve is permitted to discharge directly into conduit 12 and to the direction selection spool 45 at full supply pressure. Depending on the operating position of the latter, forward or reverse operation of the fluid clutches of the particular vehicle takes place. If now the operator depresses the brake pedal 20, the linkage means 21 is actuated by the slack or play travel of the brake pedal to withdraw piston 19 from the axial bore 26. A designed incremental movement for the piston 19 completely relieves the compression of spring 18 permitting the pressurized fluid in chamber 29 at the opposite end of the valve spool 16 to force such valve spool rapidly toward the springs, or to the left as seen in Figure 4. This operation quickly uncovers the port 50 to bleed fluid through the passageway 51 connected with passageway or conduit means 22 which provides cooling and lubricating fluid to the direction selectors 14 and 15 and discharges to the sump of the supply pump. As port 50 is uncovered, fluid is bled off causing a quick initial decrease of pressure for the fluid in chamber 32. The decrease of pressure in chamber 32 likewise causes a decrease in the pressure of fluid flowing through conduit 12 to the direction selector spool means 45. Additionally, the conduit 12 is gradually closed over to throttle the supply of liquid to the clutches. If movement of spool 16 to the left is sufficient, the cylindrical portion 28 thereof will eventually shut off or cover over the discharge conduit or passageway means 12, thus completely interrupting the flow of fluid to the clutches to deactivate the same. Under this condition, the fluid entering chamber 32 will be bypassed through port 50, passageway 51 and conduit means 22 to the forward and reverse selectors of the clutch mechanism and returned to the sump of the supply pump.

As mentioned previously, chamber 29, which is supplied from chamber 32 via the connecting passageway means 33, also communicates with the bypass passageway means 54 having an orifice 55 therein. Such passageway 54 permits constant supply of hydraulic fluid through chamber 29 to the direction selector spool 45 and associated means 13. The presence of such a bypass insures a continuous supply of fluid to the clutches so that the latter are always full of operating fluid. Therefore, when "inching" of the vehicle is required as by gradually releasing the brake pedal, no delay is experienced before the clutches commence their operation. This bypass also permits more rapid movement of the valve body 16 to the right, as viewed in Figure 4. On release of the spring loaded brake pedal, springs 17 and 18 serve to gradually move the piston spool 16 to the right, as seen in Figure 4, thereby gradually opening passageway 12 and closing over the bypass passageway 22 thus returning full operating pressure to the clutches.

Following the outlined operational concept of our new valve 10, it will be realized that it presents an ideal means for "inching" an industrial lift truck, for example; the operator merely depresses the brake pedal to cause first a rapid decrease on operating pressure followed by a gradual decrease on the supply of fluid to the clutches as caused by closing over passageway 12. Conversely, by raising the foot pedal, the clutches may be gradually engaged at will to perfect the "inching" operation.

From the foregoing descriptive materials, it is believed that the concepts and features of our invention will be clearly understood by those familiar in the art. While the invention has been disclosed and described in association with a single and preferred embodiment thereof, it is obvious that numerous changes, modifications and substitutions of equivalents may be made therein without necessarily departing from the spirit and scope of the invention. As a consequence, it is not our intention that we be limited to the particular form of the invention herein described and disclosed except as may appear in the following appended claims.

We claim:

1. For use in a wheeled vehicle having a transmission with fluid activated clutch means and a brake means for arresting movement of the vehicle, a valve means for activating and deactivating the clutch means by operation of the brake means, comprising, a valve housing having inlet means communicating with a source of pressurized fluid, valve spool means in said housing, means communicating pressurized fluid to one end of said valve spool means to move the latter in one direction, piston means opposite said valve spool means, plural compressive spring means extending between and engaging adjacent ends of said piston and valve spool means to oppose movement of the latter in said one direction, movement of said piston means away from said spool means serving to temporarily remove opposition of at least one of said spring means to the said movement of said spool means, linkage means connecting said piston means to operating mechanism for the vehicle's brake means for responsive operation therewith, first and second discharge conduit means adapted to be opened and closed to said pressurized fluid by the movement of said spool means in following said piston means, one of said conduit means supplying operating fluid to the clutch means of the vehicle and the other of said conduit means bypassing such clutch means to relieve supply fluid pressures.

2. For use in a vehicle having a transmission with fluid activated clutch means, the combination comprising, a source of pressurized fluid, conduit means supplying the clutch means with said pressurized fluid for its operation, valve means interposed in said conduit means including coaxial, spaced valve spool means and piston means, equalizing conduit means for transmitting pressurized fluid to one end of said spool means, spring means disposed coaxially with and between one end of said piston means and the other end of said spool means to oppose movement of said spool means in one direction, means connecting said piston means for operation with the brake operating mechanism of the vehicle whereby movement of said piston means in said one direction serves to substantially reduce the opposing force of said spring means to permit temporary free movement of said spool means followed by subsequent regulated movement thereof in said one direction, a second conduit means communicating with said spool means and adapted to be first supplied with said pressurized fluid by the said free movement of said spool means in said one direction, said regulated movement of said spool means in said one direction also serving to gradually close off said first named conduit means thereby to throttle the supply of fluid to said clutch means, said second named conduit means serving to bypass said clutch means and provide a means for relieving the pressures of said fluid, and third conduit means communicating between the said one end of said spool means and said clutch means and including a restricting orifice, said third named conduit means serving to supply said clutch means with a limited amount of pressurized fluids whereby the same is constantly conditioned for immediate operation independently of the fluid supplied by said first conduit means.

3. The combination as set forth in claim 2 in which said spring means comprises a pair of coaxially related compression spring means of different values, the strongest of which is completely relieved of all compression by initial movement of said piston means in said one direction and which subsequently cooperates with the second spring means to provide a variable compression thrust in controlling the said regulated movement of said spool means.

4. For use in a vehicle having a transmission with fluid fluid operated clutch means and a brake system operated by a foot pedal, an improved valve means for controlling the operation of the vehicle's clutch means, comprising, a housing having an inlet for connection with a source of pressurized fluid, a discharge conduit means for supplying said pressurized fluid to the clutch means, a direction selector means in said discharge conduit means for selecting the operational direction of said clutch means, a second conduit means communicating with the interior of said housing for relieving the pressure of said fluid, a valve spool reciprocal within said housing for controlling the passage of fluid through said discharge and second conduit means, passageway means formed in said spool means for transmitting pressurized fluid from said inlet means to said one end of said spool means, a piston means coaxial with said spool means, compressive spring means interposed between and engaging adjacent ends of said piston and spool means for opposing movement of the latter in one direction as caused by the pressurized fluid at its said one end, linkage means interconnecting said piston means with the operating pedal of the vehicle's brake means for operation therewith whereby the piston means may be moved relative to said spool means, movement of said piston means away from said spool means serving to decrease rapidly the compressive thrust of said spring means to permit successive rapid and gradual movement of said spool means in said one direction thereby to decrease the pressure and interrupt the flow of fluid to said clutch means.

5. The combination as set forth in claim 4 including bypass means communicating between said one end of said spool means and said direction selector means and comprising an orifice to restrict the flow of pressurized fluids therethrough, the bypass means serving to vent the pressurized fluid from said one end of said spool means to permit rapid return travel of said spool means in a direction opposite to said one direction.

6. The combination as set forth in claim 4 in which said spring means comprises a pair of concentrically related coaxial compression springs of different values to provide variable compressive thrust on said spool means, the movement of said piston means serving to adjust the compressive thrust of said spring means and the travel of said spool means.

References Cited in the file of this patent

UNITED STATES PATENTS

| | | |
|---|---|---|
| 2,725,890 | Kanuch | Dec. 6, 1955 |
| 2,747,714 | Eason | May 29, 1956 |